United States Patent
Andrews et al.

(10) Patent No.: US 10,246,838 B1
(45) Date of Patent: Apr. 2, 2019

(54) HIGH IMPACT JOINT AND CRACK FILLERS

(71) Applicants: James L Andrews, Huntington Beach, CA (US); Anthony Gaffney, Sun Lakes, AZ (US)

(72) Inventors: James L Andrews, Huntington Beach, CA (US); Anthony Gaffney, Sun Lakes, AZ (US)

( * ) Notice: Subject to any disclaimer, the term of this patent is extended or adjusted under 35 U.S.C. 154(b) by 0 days.

(21) Appl. No.: 16/009,077

(22) Filed: Jun. 14, 2018

(51) Int. Cl.

| | | |
|---|---|---|
| *E01C 23/00* | (2006.01) | |
| *E01C 23/09* | (2006.01) | |
| *E01C 11/00* | (2006.01) | |
| *E01C 11/10* | (2006.01) | |
| *C08L 17/00* | (2006.01) | |
| *C08G 59/06* | (2006.01) | |
| *C08G 59/62* | (2006.01) | |
| *C08K 3/04* | (2006.01) | |
| *C08K 3/22* | (2006.01) | |
| *C08G 59/50* | (2006.01) | |

(52) U.S. Cl.
CPC ........ *E01C 23/0966* (2013.01); *C08G 59/063* (2013.01); *C08G 59/502* (2013.01); *C08G 59/621* (2013.01); *C08K 3/04* (2013.01); *C08K 3/22* (2013.01); *C08L 17/00* (2013.01); *E01C 11/005* (2013.01); *E01C 11/10* (2013.01); *C08G 2190/00* (2013.01); *C08K 2003/2241* (2013.01); *C08K 2003/2272* (2013.01)

(58) Field of Classification Search
CPC .... E01C 11/005; E01C 11/10; E01C 23/0966; C08L 17/00; C08G 59/063; C08G 59/621; C08G 59/502; C08G 2190/00; C08K 3/04; C08K 3/22; C08K 2003/2272; C08K 2003/2241
USPC ............................................. 404/67, 17, 107
See application file for complete search history.

(56) References Cited

U.S. PATENT DOCUMENTS

| | | | | |
|---|---|---|---|---|
| 4,113,401 A | * | 9/1978 | McDonald | E01C 7/187 404/75 |
| 9,296,913 B2 | * | 3/2016 | Al-Aqeeli | C09D 117/00 |
| 9,670,375 B1 | * | 6/2017 | Al-Aqeeli | C09D 7/65 |
| 2010/0099800 A1 | * | 4/2010 | Ueno | C08G 59/5033 523/413 |
| 2013/0206853 A1 | * | 8/2013 | Robinson | E01B 1/00 238/2 |
| 2016/0130474 A1 | * | 5/2016 | Dongre | C09D 195/005 428/407 |

\* cited by examiner

*Primary Examiner* — Raymond W Addie
(74) *Attorney, Agent, or Firm* — Plager Schack LLP; Mark H. Plager; Kara K. Verryt

(57) ABSTRACT

A joint and crack filler composition may include a rubber aggregate and a binder made of a resin and a hardener. The rubber aggregate may be made from recycled tire rubber and may include a tri-blend of large shreds, small shreds, and fine pieces. The resin may be an epoxy, such as a semi-rigid liquid epoxy or a semi-rigid thixotropic epoxy.

6 Claims, No Drawings

HIGH IMPACT JOINT AND CRACK FILLERS

BACKGROUND

The embodiments herein relate generally to construction materials, and more particularly, to a high impact joint and crack filler designed to repair and waterproof new and aging construction joints and cracks in concrete pavement.

Existing joint and crack fillers are too rigid and fail on loading or thermal cycling. As a result, joints have to be rebuilt. Restoring joints to the original design is costly and time consuming.

Moreover, the United States generated about 300 million waste tires in 2016. While the majority of tires are reused, a significant amount, one-quarter, are not. Thus, new uses must be found for the valuable raw materials embodied within the recycled rubber from the whole tire.

Therefore, what is needed is a flexible, high impact joint and crack filler that is less likely to fail than existing materials and systems, while simultaneously providing a new use for used tires.

SUMMARY

Some embodiments of the present disclosure include a joint and crack filler composition. The composition may include a rubber aggregate and a binder made of a resin and a hardener. The rubber aggregate may be made from recycled tire rubber and may include a tri-blend of large shreds, small shreds, and fine pieces. The resin may be an epoxy, such as a semi-rigid liquid epoxy or a semi-rigid thixotropic epoxy.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a joint and crack filler and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.
  a. Binder
  b. Rubber Aggregate The various elements of the device of the present disclosure may be related in the following exemplary fashion. It is not intended to limit the scope or nature of the relationships between the various elements and the following examples are presented as illustrative examples only.

By way of example, some embodiments of the present disclosure include a joint and crack filler composition comprising a rubber aggregate and a binder, which may comprise a resin and a hardener.

The rubber aggregate component of the composition may include a recycle rubber material. For example, the rubber component may comprise material from a used tire, such as a shredded rubber material. The shredded rubber material may also include carbon black, which is resistant to wear, chemical decomposition, and sunlight. However, it may be beneficial for the rubber component to be free of various parts of the tire, such as the steel belting, halobutyl liners, belt wedges, body plies, and the like. Thus, when a used tire is shredded, the material suitable for the rubber component of the composition of the present disclosure must be isolated. However, conventionally, the tire shredding process indiscriminately shreds all components of a tire The rubber aggregate may comprise a tri-blend rubber aggregate comprising a mixture of large shreds of rubber, small shreds of rubber, and fine pieces of rubber. In a particular embodiment, the rubber aggregate may comprise about 45% large shreds, about 35% small shreds, and about 20% fine pieces. All of the rubber may comprise, for example, recycled tire rubber and may be produced using a rubber shredder and fine grinding equipment. The large shreds of rubber may have a length of from about ½ to about ¾ inch and a width of about 1/16 inch, wherein the large shreds may be polyhedral shaped. The small shreds of rubber may have a length of from about ⅛ to about ¼ inch and a width of about 1/16 inch, wherein the small shreds may be polyhedral shaped. The fine pieces may have a US sieve size of from about 60 to 120, where the fine pieces may be subangular in shape, tending toward spherical and having a comparatively low surface area. On the other hand, compared to the fine pieces, the large shreds and the small shreds may have a comparatively high surface area.

As mentioned above, the shreds and fine pieces may be manufactured from recycled tires using a shredder and fine grinding equipment. However, before shredding or grinding, the steel belt fragments may be removed from the tires using a magnetic separator. Fiberglass belts or fibers may be separated from the rubber particles using an air separator. The overall particle mixture may be subject to a dual cycle of magnetic separation and then screened and recovered in various size fractions.

The binder component of the composition may comprise any suitable resin and hardener. The volume ratio of resin to hardener may be about 2 to 1, and the weight ratio of resin to hardener may be about 10.08 to 4.06.

In embodiments, the resin may comprise an epoxy, such as a semi-rigid liquid epoxy or a semi-rigid thixotropic epoxy. An exemplary suitable epoxy resin may comprise 4,4-isopropylphenol, epichlorohydrin, nonylphenol, titanium dioxide, iron (III) oxide, and carbon black. In a particular embodiment, the epoxy resin may comprise about 60% 4,4-isopropylphenol, about 20% epichlorohydrin, about 10% nonylphenol, about 5% titanium dioxide, about 2.5% iron (III) oxide, and about 2.5% carbon black, wherein the titanium dioxide, the iron (III) oxide, and the carbon black may comprise a pigmented dispersion premixed and added as a semi-finished raw material.

The hardener may comprise polyoxypropylenediamine, nonylphenol, methylpent amethylenediamine, benzyl alcohol, and epoxy polyamine. In a particular embodiment, the hardener may comprise about 35% polyoxypropylenediamine, about 32% nonylphenol, about 17% methylpent amethylenediamine, about 4% benzyl alcohol, and about 12% epoxy polyamine (for adduction), wherein the components may be held in a vessel until the reaction reaches 50° C.

In embodiments, a packaging for the filler composition of the present disclosure may be arranged as a kit such that the epoxy, the hardener, and the tri-blend rubber may be packaged separately and only combined shortly before use of the filler.

The filler composition of the preset disclosure may have the following physical properties and cure times at 77° F. (25° C.):

| Physical Properties | |
|---|---|
| Mix ratio, by volume | 2:1 |
| Solids Content | 100% |
| VOC (Volatile Organic Compounds) | 0 gr./lt. |
| Viscosity, semi-rigid epoxy liquid | 1250 cps |
| Viscosity, semi-rigid epoxy thixotropic | Sag Resistant |
| Pot life, Regular cure, 1 quart (0.95 Liters) Mass | 45 minutes |

Pot life may be reduced by increases in mass and/or temperature

| Cure Time | | |
|---|---|---|
| Regular Cure | Regular Cure | Fast Cure |
| Dry to Touch | 12 hours | 6 hours |
| Light Traffic | 24 hours | 12 hours |
| Full Cure | 7 days | 5 days |

Cure times are influenced by both ambient air temperature and the concrete substrate temperature The density of the composition may increase with decreasing shred size and with increasing compressive forces, but the flexibility and deformability of the composition may accentuate the density. Because the composition of the present disclosure may be impervious to water, it may not absorb or entrap water within the filler. Moreover, because the composition of the present disclosure is compressible, it may absorb vibrations, such as those emanating from rapid heavy equipment moving over an adjacent slab on grade. Thus, using the filler of the present disclosure may provide vibration insulation, which may off-set seismic vibration control from concrete slab to concrete slab. Fillers made from the composition of the present disclosure may be capable of withstanding a full range of ambient temperature extremes without undergoing permanent property change. Some properties, such as flexibility, may change as a function of temperature, but this change is reversible and repeatable.

Because the difference in the coefficient of thermal expansion between the composition of the present disclosure and cement concrete is significant, fillers made from the composition of the present disclosure must be able to handle the difference.

To use the filler composition of the present disclosure, the rubber aggregate and binder may be mixed to form the composition. The composition may then be used to fill joints and cracks in concrete pavement and other construction materials. Installation coverage and the amount necessary for filling a particular joint or crack varies based on the application method and the width and depth of the joint or crack. In general, though, the filler composition may be mixed and poured and/or troweled into the joints and cracks immediately after mixing to extend work time. Mixing may be done for about 2 minutes using a low speed mixer, such as a low speed drill. After the material is placed, it should be struct level with the concrete. If the material slumps, additional pours may be done to bring the material flush with the concrete. After placement, the top surface may be dusted with silica sand or aluminum oxide mineral aggregates.

The filler composition may be in a liquid state or a thixotropic liquid state. Which version is used may depend on the void spacing. For example, for joints and cracks narrower than one inch in width, the liquid version may be best. On the other hand, for larger joints and cracks, the thixotropic version may be more suitable.

The filler composition may work best when installed at a surface temperature of from about 50° F. (10° C.) to about 90° F. (32° C.). Moreover, it may be beneficial for the concrete or other construction material to be cured for at least 30 days and be dry, clean, and structurally sound per ACI 202 Guide to Durable Concrete. For concrete, it may also be beneficial for the surface to be grit blasted or diamond ground to achieve an International Concrete Repair Institute Guideline No. 310.2R Selecting and Specifying Concrete Surface Preparation for Sealers Coatings and Polymer Overlays ICRI profile of CSP 3 or greater.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A joint and crack filler composition comprising:
   a rubber aggregate comprising a tri-blend aggregate comprising a mixture of large shreds of rubber, small shreds of rubber, and fine pieces of rubber; and
   a binder comprising a resin and a hardener,
   wherein:
   the large shreds of rubber have a length of from about ½ to about ¾ inch and a width of about 1/16 inch;
   the small shreds of rubber have a length of from about ⅛ to about ¼ inch and a width of about 1/16 inch; and
   the fine pieces have a US sieve size of from about 60 to 120.

2. The joint and crack filler composition of claim 1, wherein the rubber aggregate comprises:
   about 45% large shreds;
   about 35% small shreds; and
   about 20% fine pieces.

3. The joint and crack filler composition of claim 1, wherein the rubber aggregate comprises recycled tire rubber.

4. The joint and crack filler composition of claim 1, wherein a volume ratio of resin to hardener is about 2 to 1.

5. The joint and crack filler composition of claim 1, wherein the resin is an epoxy selected from the group consisting of a semi-rigid liquid epoxy and a semi-rigid thixotropic epoxy.

6. The joint and crack filler composition of claim 1, wherein the hardener comprises a mixture of polyoxypropylenediamine, nonylphenol, methylpent amethylenediamine, benzyl alcohol, and epoxy polyamine.

* * * * *